United States Patent [19]

Huemke et al.

[11] Patent Number: 5,401,823
[45] Date of Patent: Mar. 28, 1995

[54] BINDERS FOR ELECTROCOATING

[75] Inventors: Klaus Huemke, Friedelsheim; Gerhard Hoffmann, Otterstadt; Dieter Faul, Bad Duerkheim; Rainer Blum, Ludwigshafen, all of Germany

[73] Assignee: BASF Lacke & Farben AG, Muenster, Germany

[21] Appl. No.: 27,841

[22] Filed: Mar. 8, 1993

[30] Foreign Application Priority Data

Mar. 13, 1992 [DE] Germany ............ 42 08 056.8

[51] Int. Cl.⁶ .................... C08G 18; C08G 81
[52] U.S. Cl. .................... 528/45; 528/44; 524/589; 524/590; 524/591; 524/599
[58] Field of Search ............ 528/45, 44; 524/589, 524/590, 591, 593, 599

[56] References Cited

U.S. PATENT DOCUMENTS

| | | | |
|---|---|---|---|
| 4,293,398 | 10/1981 | Prucnal | 204/181 C |
| 4,452,681 | 6/1984 | Moriarty | 204/181 R |
| 4,495,327 | 1/1985 | Schenck et al. | 524/556 |

FOREIGN PATENT DOCUMENTS

| | | |
|---|---|---|
| 102566 | 3/1984 | European Pat. Off. . |
| 318963 | 6/1989 | European Pat. Off. . |
| 456270 | 11/1991 | European Pat. Off. . |
| 462496 | 12/1991 | European Pat. Off. . |
| 3938203 | 5/1991 | Germany . |

*Primary Examiner*—John Kight, III
*Assistant Examiner*—Duc Truong
*Attorney, Agent, or Firm*—Keil & Weinkauf

[57] ABSTRACT

Binder systems suitable for electrocoating and consisting of a base resin A which carries groups which can be protonated with acids or cationic quaternary groups and, if desired, hydroxyl or thiol groups, a crosslinking component B which carries at least two blocked isocyanate groups per molecule and an organic iron compound C which is partially or completely soluble in water, as a catalyst for the thermal crosslinking of components A and B, and if desired, an additive D which increases the catalytic activity of C, are used to prepare dispersions which are used for electrocoating.

16 Claims, No Drawings

BINDERS FOR ELECTROCOATING

The present invention relates to novel binder systems which are suitable for electrocoating and consist of
a base resin A which carries groups which can be protonated with acids or cationic quaternary groups and, if desired, hydroxyl or thiol groups,
a crosslinking component B which carries at least two blocked isocyanate groups per molecule and
an organic iron compound C which is partially or completely soluble in water, as a catalyst for the thermal crosslinking of components A and B, and if desired, an additive D which increases the catalytic activity of C.

The present invention furthermore relates/to aqueous dispersions which contain such binder systems and to the use of the dispersions for electrocoating.

It is generally known that cathodic electrocoating is widely used for coating metal parts, particularly in the automotive industry. It has been possible to achieve good corrosion protection to date especially when lead-containing electrocoating baths are used. In an effort to replace lead with other substances, aluminum phosphate in combination with a zinc compound or boric acid has been proposed (EP-A 0 318 963), but the curing rate is unsatisfactory.

Catalyst solutions for polyurethane formation which contain an iron(III) compound, an aromatic carbonyl or hydroxy compound, a polyol and, if required, an imidazole or benzimidazole are disclosed in DE-A 39 38 203.

It is an object of the present invention to provide novel binder systems, especially for electrocoating, which, even in the absence of lead or with only small amounts of lead, give coatings having good corrosion resistance and good flexibility and permit rapid curing.

We have found that this object is achieved by the binder systems defined at the outset.

We have also found dispersions which contain these binder systems and their use for cathodic electrocoating, as well as a process for electrocoating using the dispersions and articles coated by this process.

The embodiments which are particularly advantageous for the use of the novel binder systems for electrocoating are described below.

Component A

The base resins which are suitable as component A are resins which carry cationic quaternary groups or groups which can be protonated with acids. Examples of cationic quaternary groups are sulfonium, ammonium or phosphonium groups, which ensure dispersibility of the resins in water. Primary or secondary amino groups serve the same purpose after protonation with an acid. Resins having primary and/or secondary amino groups are particularly preferred. The base resins may furthermore carry reactive groups in the form of hydroxyl or thiol groups.

All base resins preferably have an average molecular weight of from 200 to 20,000, particularly preferably from 200 to 5,000. The total number of cationic quaternary groups or groups which can be protonated with an acid is on average preferably from 2 to 20, particularly preferably from 2 to 15, per molecule A. The number of hydroxyl and thiol groups is on average preferably from 2 to 40, particularly preferably from 2 to 15.

Base resins which are suitable for component A are in particular polymers of the polyurethane and epoxy resin type.

Polyurethanes ($a_1$) obtained from aliphatic and/or aromatic diisocyanates and aliphatic diols or polyoles have proven suitable base resins when they have the groups required for dispersing water. Primary or secondary amino groups can be introduced into the polymer by reacting the isocyanates with terminating polyfunctional amines. These amines may have primary and secondary amine functions, such as diethylenetriamine, triethylenetetramine and polyetherdiamines having terminal amino groups. They may also carry primary and tertiary amine functions, such as dimethylaminopropylamine and diethylaminopropylamine.

Examples of diisocyanates are in particular tetramethylenediisocyanate, hexamethylenediisocyanate, isophorone diisocyanate, diphenylmethane diisocyanate, toluylene diisocyanate, naphthylene diisocyanate and phenoxyphenyl 4,4'-diisocyanate.

Suitable diols are in particular ethylene glycol, diethylene glycol, triethylene glycol, propanediol, butanediol, hexanediol, neopentylglycol and neopentylglycol hydroxypivalate. However, alcohols having a higher functionality, such as trimethylolpropane, glycerol, pentaerythritol and trimethylolbenzene, are also suitable.

Particularly preferred base resins are those whose parent structures are based on epoxy resins ($a_2$).

It is possible to use epoxy resins which are obtainable by reacting polyhydric phenols with an epihalohydrin. The molecular weight can be controlled by means of the molar ratio of the starting compounds. Examples of such polyhydric phenols are resorcinol, hydroquinone, 2,2-di-(4-hydroxyphenyl)-propane (bisphenol A), p,p'-dihydroxybenzophenone, p,p'-dihydroxybiphenyl, 1,1-di-(4-hydroxyphenyl)-ethane, bis-(2-hydroxynaphthyl)methane, 1,5-dihydroxynaphthylene and novolaks. Bisphenol A is preferably used. The preferred epihalohydrin is epichlorohydrin. In addition to epoxy resins consisting of polyhydric phenols and epihalohydrin, it is also possible to use polyglycidyl ethers of polyhydric aliphatic alcohols, such as ethylene glycol, diethylene glycol, triethylene glycol, 1,2-propylene glycol, 1,3-propylene glycol, 1,4-butanediol, 1,5-pentanediol, 1,6-hexanediol, 1,2,6-hexanetriol, glycerol or 2,2-bis(4-hydroxycyclohexyl)-propane.

Very particularly preferred epoxy resins are those which are obtainable by reaction of diglycidyl ethers of bisphenol A with polyhydric phenols, in particular bisphenol A, or by reaction with long-chain alkylphenols, such as 4-nonylphenol, or monoetherglycols, such as 2-phenoxypropan-1-ol. Such reactions can be catalyzed by amines, such as dibenzylamine.

For the introduction of acid-protonatable groups, epoxy resins which furthermore carry epoxy groups can be reacted with an amine or a mixture of different amines. These amines include alkylamines, alkylalkanolamines, polyoxyalkylenepolyamines and polyfunctional polyolefinamines. Suitable base resins are products which are obtained by reacting an epoxy resin with an excess of primary alkyldiamines whose alkyl radical is of 2 to 20 carbon atoms. Particularly suitable diprimary alkyldiamines are ethylenediamine, 1,2- and 1,3-diaminopropane, 1,4-diaminobutane, neopentanediamine and hexamethylenediamine. Suitable secondary dialkylmonoamines are those whose alkyl radicals are of 1 to 20 carbon atoms, dimethylamine and diethylamine being preferred. Alkylalkanolamines whose alkyl and alkanol radicals are each of 1 to 20 carbon atoms are also suitable, and the chain length of the radicals may be identical or different. Examples of alkylalkanolamines are ethylethanolamine, methylisopropanolamine and in particular methylethanolamine. The polyoxyalkylenepolyamines which may be used are, for example, polyoxyethylenepolyamine, polyoxypropylenepolyamine and polyoxybutylenepolyamine. The group comprising the polyolefinpolyamines includes amine-terminated butadiene/acrylonitrile copolymers having an average molecular weight of from 200 to 5,000.

If desired, the amine-modified epoxy resins may be subjected to a chain-extending reaction with dicarboxylic acids, for example with sebacic acid or with a dimeric fatty acid. It is also possible to use monocarboxylic acids, such as a fatty acid.

Amine components may furthermore be introduced into the epoxy resins by reaction with an amidoamine, ie. condensates of dicarboxylic acids, preferably dimeric fatty acids, and polyamines, preferably aliphatic polyamines, eg. diethylenetriamine or triethylenetetramine. Terminating monocarboxylic acids, preferably $C_{12}$–$C_{20}$-carboxylic acids, can be incorporated into the amidoamine. Products whose amine number is from 200 to 500 mg/g are particularly suitable.

The amine-modified epoxy resins can, if desired, be used as a mixture of from 0 to 20% by weight of polyesters. These polyesters have an average molecular weight of from 200 to 20,000, preferably from 200 to 5,000. They are polycondensates of dicarboxylic acids and polyhydric alcohols.

Suitable carboxylic acid components are compounds such as maleic acid, succinic acid, glutaric acid, adipic acid, pimelic acid, suberic acid, azelaic acid, sebacic acid, cyclohexanedicarboxylic acid, phthalic acid, isophthalic acid and terephthalic acid and functional derivatives of these acids. Examples of alcohol components are aliphatic diols, such as ethylene glycol, diethylene glycol, triethylene glycol, propanediol, butanediol, hexanediol, neopentylglycol and neopentylglycol hydroxypivalate, as well as alcohols having a higher functionality, such as trimethylolpropane, glycerol, erythritol, pentaerythritol, trimethylolbenzene and tris-(hydroxyethyl) isocyanurate.

Hydroxyl or thiol groups can be introduced into the resins by reacting alcohols or thiols with epoxy groups.

Component B

The novel binder systems contain a crosslinking agent as component B, preferably in an amount of from 5 to 50, particularly preferably from 10 to 40, % by weight. Suitable crosslinking agents are blocked polyfunctional isocyanates or mixtures of different blocked, polyfunctional isocyanates.

These crosslinking agents are derived from, for example, 1,6-hexamethylene diisocyanate, naphthalene diisocyanate and triphenylmethane triisocyanate and the trimers of 1,6-hexamethylene diisocyanate, isophorone diisocyanate and toluylene diisocyanate, toluylene diisocyanate, diphenylmethane 4,4'-diisocyanate, isophorone diisocyanate and the trimer of 1,6-hexamethylene diisocyanate being preferred.

For example, monohydric alcohols, preferably short-chain, aliphatic alcohols, such as methanol, ethanol, n-propanol, isopropanol, n-butanol, isobutanol or sec-butanol, are suitable for blocking. Monoethers of aliphatic diols, such as ethylene glycol monopropyl ether and ethylene glycol monobutyl ether, are also suitable. Secondary amines, preferably short-chain aliphatic amines, such as dimethyl-, diethyl-, dipropyl- or dibutylamine, or alkanolamines, preferably tertiary alkanolamines, such as tri-n-propanolamine or triisopropanolamine, or mixtures thereof are also useful. The polyfunctional isocyanates are reacted with the blocking compounds in a conventional manner in amounts such that on average as far as possible all isocyanate groups per molecule are blocked.

Components C and D

Component C is an organic iron compound which is partially or completely soluble in water.

Iron salts of carboxylic acids, such as formic acid, acetic acid, propionic acid, oxalic acid, fumaric acid and citric acid, are suitable. Iron salts of complexing agents, such as ethylenediaminetetraacetic acid, nitrilotriacetic acid or isoserinediacetic acid, can also be used as component C. Another suitable component C is iron acetylacetonate. Complexes of iron with aromatic carbonyl or hydroxy compounds are further examples. These can be prepared by converting other iron salts. In a preferred embodiment, iron(III) salts are reacted with aromatic aldehydes, especially salicylaldehyde, at 50°–100° C. in the course of from 2 to 10 hours and the reaction product is used directly as component C.

Component C is used in catalytically effective amounts. Preferred amounts are from 0.002 to 0.5, particularly preferably from 0.01 to 0.3, % by weight, based on the total weight of components A and B.

The catalytic activity of iron compound C can be further increased by additives D. Additives D may be cyclic nitrogen bases. Imidazoles or benzimidazoles are particularly advantageous, among which 1,2-dimethylimidazole is particularly preferred. The amount of these additives may be from 5 to 90, preferably from 10 to 80, % by weight, based on the total weight of C and D.

Components C and D can be used as such but are preferably employed in a solvent. Suitable solvents are polar compounds, such as acetone, methyl tert-butyl ketone and methyl tert-amyl ketone, and polyfunctional alcohols, such as polyethylene glycol having an average molecular weight from 200 to 10,000, are suitable solvents. Mixtures of these solvents are also useful.

The solvent is advantageously used in amounts of from 50 to 95, preferably from 70 to 90, % by weight, based on the total weight of components C and D and the solvent.

A catalyst system which is prepared by reacting iron acetylacetonate with salicylaldehyde in a solvent in the presence of 1,2-dimethylimidazole is particularly preferred.

The base resin A is dispersible in water, in the case of amino-carrying base resins after partial or complete neutralization. Mineral acids, such as phosphoric acid, and preferably carboxylic acids, such as formic acid, acetic acid, propionic acid and lactic acid, are suitable for neutralization. It is advantageous thoroughly to mix base resin A and crosslinking agent B prior to neutralization. Such mixtures contain from 50 to 95% by weight of A and from 5 to 50% by weight of B.

It has also proven useful to mix the catalyst with components A and B prior to neutralization, in order to achieve a homogeneous distribution of all components. However, separate addition of component C and possibly further additives D to the dispersed resin system is also possible. The dispersions can be diluted with water to a desired solids content. To obtain a very stable dispersion, the dispersed particles should have a mean particle size of 10–200 nm.

For the preparation of electrocoating baths, further binders, pigments and assistants and additives conventionally used in electrocoating, such as fillers, corrosion inhibitors, dispersants, antifoams and/or solvents, may be added to the novel binder systems.

Electrocoating is effected in a conventional manner.

After cathodic deposition, the novel binders give good corrosion protection on metal parts and remain flexible. The coatings cure rapidly. The properties can even be obtained when the coatings contain little or no lead.

EXAMPLES

1. Preparation of a base resin A 960 g of a polyglycidyl ether based on 2,2-di-(4-hydroxyphenyl)-propane (bisphenol A) and epichlorohydrin (epoxide equivalent weight 480), 110 g (0.5 mol) of 4-nonylphenol and 56 g (0.37 mol) of 2-phenoxypropan-1-ol were heated with 1.1 g (0.01 mol) of dibenzylamine at 130° C. until an epoxide equivalent weight of 1040 was reached. This mixture was diluted with 360 g of isobutanol and 40 g of ethylene glycol monobutyl ether and was reacted with 30 g (0.4 mol) of methylethanolamine for 10 minutes at 60° C. After the addition of 98 g of a solution of an amidoamine and 36 g of isobutanol and 4 g of ethylene glycol monobutyl ether, heating was carried out for 2 hours at 80° C. The base resin had a solids content of 70% and an amine number of 51 mg/g, and the number of acid-protonatable groups and of hydroxyl groups was on average 15.

The amidoamine was prepared by reacting 290 g (2.5 mol) of hexamethylenediamine, 218 g (0.38 mol) of a dimeric fatty acid and 70 g (0.25 mol) of linoleic acid in 31 g of xylene at 190° C. while distilling off the water of reaction. After dilution with 92 g of xylene and the addition of 7 g (0.01 mol) of hexamethylenediamine, the amine number was 350 mg/g.

2. Preparation of a crosslinking agent B 388 g (3 mol) of dibutylamine were added to 504 g (3 mol) of trimerized hexamethylene diisocyanate in 400 g of xylene at 70° C. and the mixture was kept at this temperature until the isocyanate value was about 0. The solids content was 70%.

3. Preparation of various catalyst systems

Catalyst system K1

24 g (0.067 mol) of iron(III) acetylacetonate, 57.7 g (0.6 mol) of 1,2-dimethylimidazole and 9.6 g (0.08 mol) of salicylaldehyde in 861 g of polyethylene glycol having an average molecular weight $\overline{M}_W$ of 6500 and 48 g of methyl isoamyl ketone were heated at 100° C. until the color changed to dark red (about 5 hours).

Catalyst system K2

Reaction as for catalyst 1 but without 1,2-dimethylimidazole.

Catalyst system K3

Reaction as for catalyst 1 but with 20 g (0.11 mol) of iron(III) acetate instead of iron acetylacetonate.

4. Preparation of dispersions 42.6 g of 50% strength aqueous lactic acid were added to 850 g of binder A, 364 g of crosslinking agent B and the amounts of catalyst systems stated in the Table, and dispersing was effected in 1.19 kg of water. The organic solvents were removed by azeotropic distillation and were replaced with the corresponding amount of water. Dispersions D1–D7 had a solids content of 35%.

For comparison, a dispersion was prepared from binder A and crosslinking agent B, without components C and D.

5. Preparation of a pigment paste 388 g of a grinding resin were dispersed with 77.6 g of 50% strength aqueous lactic acid in 1060 g of water. After the addition of 865 g of titanium dioxide, 19.5 g of carbon black, 156 g of zinc silicate and 195 g of aluminum silicate, milling was effected in a ball mill to a particle fineness of less than 7 μm. The paste had a solids content of 60%.

The grinding resin was prepared by reacting 805 g of diglycidyl ether based on bisphenol A and epichlorohydrin (epoxide equivalent weight 188), 379 g of polytetrahydrofuran diglycidyl ether (epoxide equivalent weight 415), 205 g (0.9 mol) of bisphenol A, 118 g (0.45 mol) of 4-dodecylphenol, 99 g (0.45 mol) of 4-nonylphenol, 42.6 g of propylene glycol monophenyl ether and 0.5 g of triphenylphosphine at 130° C. When an epoxide equivalent weight of 475 had been reached, 90 g of propylene glycol monomethyl ether were added. At 80° C., 479 g (1.71 mol) of linoleic acid were added in the course of 1 hour, followed by 227 g (1.71 mol) of diethylaminopropylamine. When the epoxide equivalent weight had decreased to about zero, 103 g (3.43 mol $CH_2O$) of paraformaldehyde were added and the reaction mixture was kept at 80°–90° C. until the formaldehyde had been completely converted. The grinding resin had a solids content of 94.8% and an amine number of 81 mg/g.

6. Electrocoating and tests

For the cathodic electrocoating, 1980 g of dispersions D1 to D7 and the comparative dispersion were mixed with 620 g of pigment paste and brought to a solids content of 21% with water.

Deposition was effected at room temperature in a conventional manner on phosphated steel sheets which had been made the cathode, and baking was carried out for 25 minutes. At deposition voltages of 320–380 V, coat thicknesses of 23 μm were achieved. Further details are shown in the Table. Other mechanical properties and the corrosion protection met very high quality requirements.

Acetone test: The test consists of rubbing an acetone-impregnated cotton pad to and fro 50 times on the coat surface under pressure. Visual rating from 0 (no attack) to 5 (very pronounced attack) is carried out.

RI: Reverse impact (according to ASTM D 2794), determination using a mandrel impact tester.

TABLE

| | | DISPERSIONS | | | COATINGS | |
|---|---|---|---|---|---|---|
| | Catalyst | Iron [g] | 1,2-Dimethyl-imidazole [ppm] | Mean particle size [nm] | Acetone test Baking temperature 150° C. | RI [Nm] Baking temperature 160° C. |
| D1 | K1 | 8 | 13 | 200 | 140 | 1–2 | 15.8 |

TABLE-continued

| | | | | Mean | COATINGS | |
| | Catalyst | Iron | 1,2-Dimethyl-imidazole | particle size | Acetone test Baking temperature | RI [Nm] Baking temperature |
| | | [g] | [ppm] | [ppm] | [nm] | 150° C. | 160° C. |
| --- | --- | --- | --- | --- | --- | --- | --- |
| D2 | K1 | 16 | 26 | 400 | 120 | 0 | 15.8 |
| D3 | K1 | 40 | 65 | 1000 | 90 | 0 | 15.8 |
| D4 | K1 | 80 | 130 | 2000 | 110 | 0 | 18.8 |
| D5 | K1 | 160 | 260 | 5000 | 150 | 0 | 18.8 |
| D6 | K2 | 40 | 130 | — | 30 | 0 | 15.8 |
| D7 | K3 | 40 | 200 | 2000 | 110 | 0 | 15.8 |
| Comparison | — | — | — | — | 140 | 4 | 9.1 |

We claim:

1. A binder system which is suitable for electrocoating and consists essentially of
an essentially olefinic free base resin A which carries primary and/or secondary amino groups which can be protonated with acids or cationic quaternary groups and, optionally, hydroxyl or thiol groups,
a crosslinking component B which carries at least two blocked isocyanate groups per molecule,
an organic iron compound C, obtained by reaction of iron (III) salts with aromatic aldehydes, which is partially or completely soluble in water, as a catalyst for the thermal crosslinking of components A and B, and
optionally, an additive D which increases the catalytic activity of C.

2. A binder system as claimed in claim 1, consisting of from 50 to 95% by weight of the base resin A, from 5 to 50% by weight of the crosslinking component B and catalytically effective amounts of the iron compound C.

3. A binder system as claimed in claim 1, wherein the base resin A has an average molecular weight of from 200 to 20,000 and the total number of cationic quaternary groups or of groups which can be protonated with an acid is on average from 2 to 15 and the total number of hydroxyl and thiol groups is on average from 2 to 15 per molecule A.

4. A binder system as claimed in claim 1, wherein the base resin A is
 a$_1$) a polyurethane
 a$_2$) an epoxy resin
or a mixture of these binders.

5. A binder system as claimed in claim 1, wherein component C is an iron compound obtained by reaction of iron (III) salts with salicylaldehyde.

6. A binder system as claimed in claim 1, which, in addition to the iron compound C, contains a cyclic nitrogen base as a catalyst component.

7. A binder system as claimed in claim 6, wherein the cyclic nitrogen base is an imidazole or a benzimidazole.

8. An aqueous dispersion which can be used directly for electrocoating and contains a binder system as claimed in claim 1.

9. A process for the production of a solid coating on electrically conductive materials by the method of cathodic electrocoating, wherein a dispersion as claimed in claim 8 is applied to an electrically conductive material to form a coating, and the resulting coating is crosslinked at from 100° to 200° C.

10. An article coated by cathodic electrocoating and obtained by a process as claimed in claim 9.

11. The binder system of claim 1 wherein the aromatic aldehyde is salicylaldehyde.

12. The binder system of claim 1 wherein the base resin A contains an average of from 2 to 20 primary and/or secondary amino groups per molecule of base resin A.

13. The binder system of claim 1 wherein the base resin A contains an average of from 2 to 20 hydroxyl and/or thiol groups per molecule of base resin A.

14. The binder system of claim 4 wherein the base resin is an epoxy resin which is the reaction product of a polyhydric phenol with an epichlorohydrin further reacted with an amine to produce the primary and/or secondary amino groups.

15. The binder system of claim 14, wherein base resin A is the reaction product of a polyglycidyl ether of 2,2-di-(4-hydroxyphenyl)-propane with epichlorohydrin, nonylphenol and 2-phenoxypropan-1-ol further reacted with methyl ethanol amine.

16. The binder system of claim 15 wherein the catalyst is prepared by reacting iron acetylacetonate with salicylaldehyde in a solvent in the presence of 1,2-dimehylimidazole.

* * * * *